United States Patent [19]
Flemming

[11] 3,891,232

[45] June 24, 1975

[54] INDEPENDENT WHEEL SUSPENSION FOR MOTOR VEHICLES

[75] Inventor: Helmut Flemming, Kemnat, Germany

[73] Assignee: Daimler-Benz Aktiengesellschaft, Germany

[22] Filed: Dec. 21, 1973

[21] Appl. No.: 427,308

[30] Foreign Application Priority Data
Dec. 23, 1972 Germany............................ 2263356

[52] U.S. Cl............................ 280/124 A; 267/20 A
[51] Int. Cl.............................................. B60g 11/16
[58] Field of Search.................... 280/124 A, 124 B; 267/20 R, 20 A; 180/85, 88

[56] References Cited
UNITED STATES PATENTS

| | | | |
|---|---|---|---|
| 3,163,440 | 12/1964 | Vail | 280/124 A |
| 3,177,965 | 4/1965 | Dews | 267/20 A |
| 3,603,422 | 9/1971 | Cordiano | 267/20 |

*Primary Examiner*—Philip Goodman
*Assistant Examiner*—John A. Carroll
*Attorney, Agent, or Firm*—Craig & Antonelli

[57] ABSTRACT

An independent wheel suspension, especially for the non-steered wheels of motor vehicles, which includes a cross guide member rigidly connected with the wheel carrier and pivotally mounted on the body side, as well as two further guide members extending generally in the vehicle longitudinal direction which are pivotally mounted both on the wheel side and on the body side; the lower forwardly extending one of the two further guide members thereby extends forwardly upwardly with an inclination while the cross guide member extends obliquely forwardly.

30 Claims, 5 Drawing Figures

PATENTED JUN 24 1975  SHEET 2  3,891,232
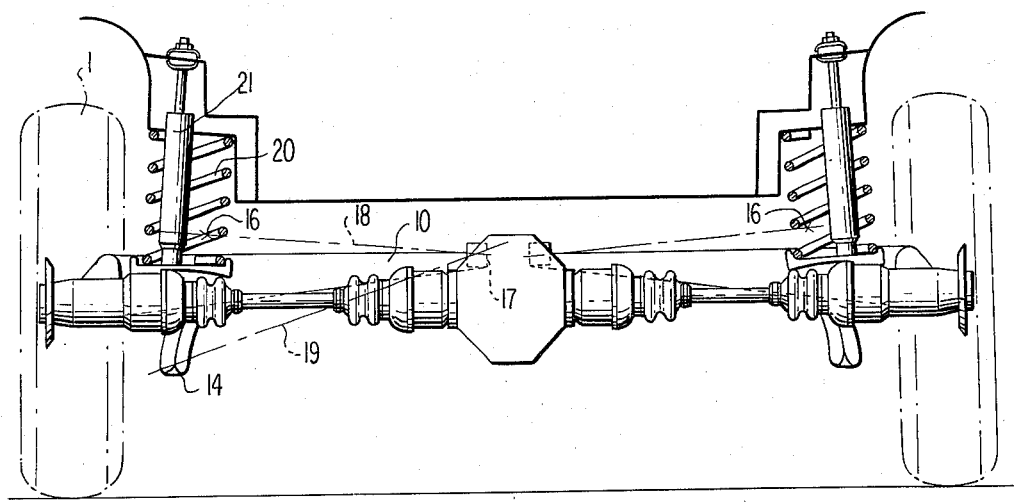
FIG. 3
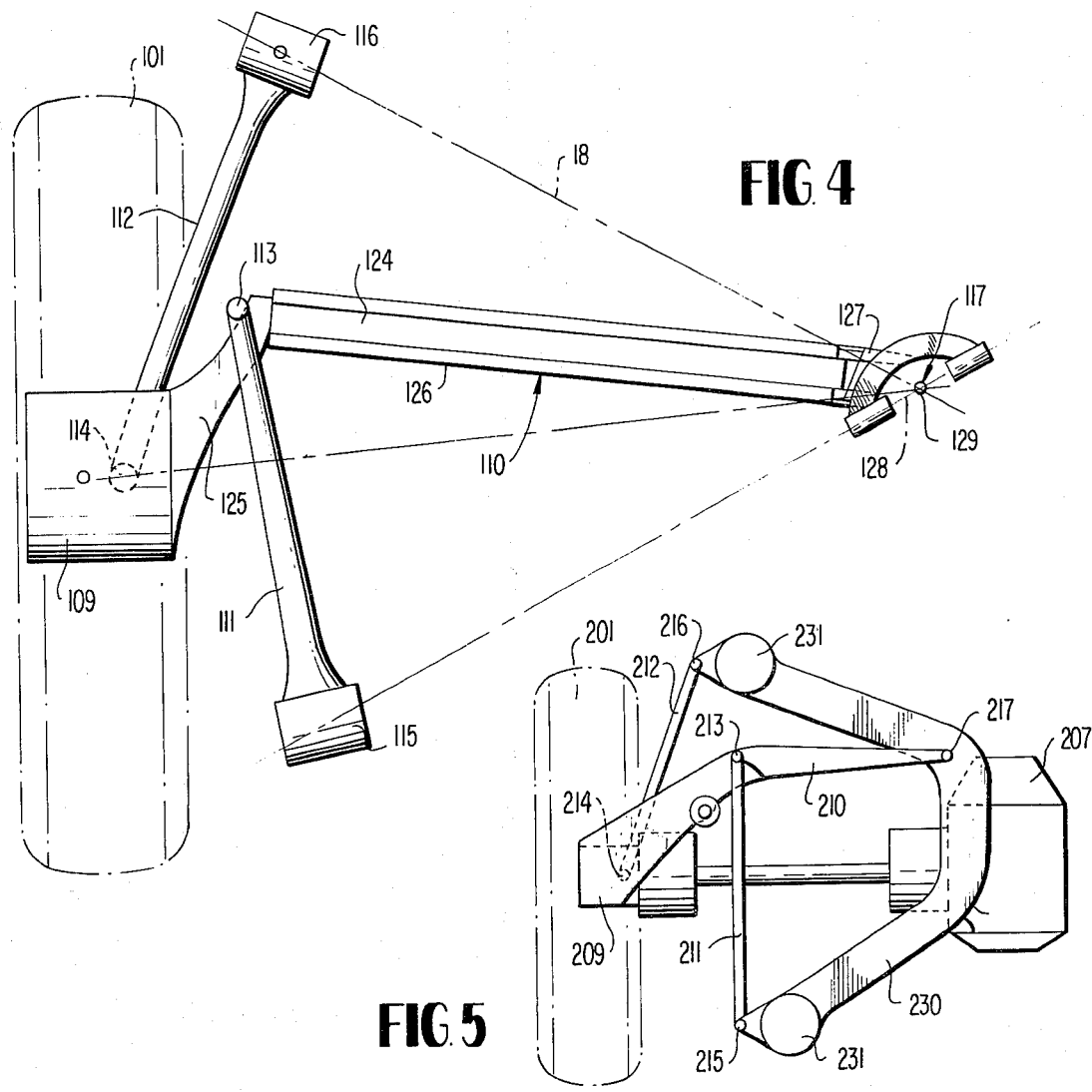
FIG. 4
FIG. 5

INDEPENDENT WHEEL SUSPENSION FOR MOTOR VEHICLES

The present invention relates to an independent wheel suspension, especially for the non-steered wheels of motor vehicles, in which a cross guide member is provided, which is rigidly connected with the wheel carrier and pivotally retained on the body side, and which includes two further guide members extending in the vehicle longitudinal direction which are pivotally mounted at the wheel side and at the body side, and of which the lower one extends forwardly.

In a known wheel suspension of this type, the forwardly extending lower guide member and the rearwardly extending upper guide member form a Watt-type linkage by means of which the wheel carrier is guided together with a cross guide member which is rigidly connected with the wheel carrier and extends in the vehicle cross direction. With such a wheel suspension, relatively large camber changes and unfavorable track changes occur and additionally also there is lacking the starting and braking support necessary in modern motor vehicle construction for the driving comfort which one aims at.

The present invention is now concerned with the task to so further develop an independent wheel suspension of the aforementioned type that an acceleration and braking support is achieved and that slight camber changes result.

According to the present invention, this is achieved with an independent wheel suspension of the type in question herein that, in relation to the vehicle longitudinal direction, the forwardly extending lower guide member is arranged extending obliquely upwardly and the cross guide member is arranged extending obliquely forwardly. The position of the cross guide member obliquely forwardly has as a consequence that relatively small camber changes result whereby the magnitude of the camber changes becomes the smaller, the further the point of pivotal connection of the cross guide member on the body side approaches the vertical vehicle cross plane, in which is located the point of pivotal connection of the lower guide member on the body side. The position of the lower guide member obliquely upwardly has as a consequence the desired acceleration and braking support.

In order to attain with such a construction a good toe-in change, it is appropriate according to the present invention if, in reference to the basic position, the upper guide member is so arranged that it extends, as viewed in side view, at an angle relative to the perpendicular with respect to the tangent which, assuming a rigid connection of the lower guide member with the wheel carrier in a position corresponding to the basic position and a disengagement of the upper guide member from the wheel carrier, is placed against the movement path described by the point of pivotal connection of the upper guide member at the wheel carrier during a rotation about the pivot axis determined by the points of pivotal connection on the body side of the lower guide member and of the cross guide member. The wheel carrier is pivoted about an axis by means of the upper guide member which is determined by the point of pivotal connection on the wheel side of the lower guide member and the point of pivotal connection on the body side of the cross guide member. The pivoting movement obtained about the aforementioned axis by the upper guide member becomes operable to the effect that with a corresponding position of the upper guide member the negative influences on the toe-in, conditioned by the selected position for the lower guide member and the cross guide member, are compensated for or balanced out.

Various possibilities exist for the realization of the present invention as will become more apparent hereinafter.

Furthermore, it is appropriate within the scope of the solution according to the present invention if the point of pivotal connection on the wheel side of the upper guide member is located within the area in front of the vertical vehicle cross plane containing the wheel axis. A good adaptation to the prevailing conditions and therewith also a particularly favorable correction of the toe-in is possible thereby. The point of pivotal connection on the frame (body) side of the upper guide member is located, in relation to the vehicle longitudinal direction, preferably to the rear of the point of pivotal connection on the wheel side.

A preferred location for the point of pivotal connection on the wheel side of the upper guide member is achieved if this point of pivotal connection is located within the center area between the vehicle cross plane containing the wheel axis and the pivot axis formed by the points of pivotal connection on the frame side of the lower guide member and of the cross guide member.

In a further constructive embodiment of the present invention, it is appropriate if the cross guide member includes a guide element elastically torsional in relation to its longitudinal axis and is pivotally connected in a non-rotatable manner on the body side with respect to this axis. More particularly, a very space-saving construction is achievable in this manner in which the pivot movements of the cross guide member in relation to its longitudinal axis, which result during spring movements, can be utilized for the spring support of the vehicle. In an appropriate construction of this inventive concept, the guide element can be formed by a torsion rod spring.

A further embodiment according to the present invention consists in forming the cross guide member by a guide element torsional in relation to its longitudinal axis, which is attainable with advantage, for example, in that a tubular member provided with slots extending in the direction of its longitudinal axis is provided which is pivotally connected on the body side in a non-rotatable manner. The pivotal connection of the elastically torsional guide element on the body side takes place appropriately in a cardan-like manner.

In a still further embodiment of the present invention, it may be appropriate if the point of pivotal connection on the body side of the guide members extending in the vehicle longitudinal direction and of the cross guide member are provided at an auxiliary bearer. A common auxiliary bearer may thereby be provided for both axle sides or one independent auxiliary bearer may be coordinated also to each axle side.

Accordingly, it is an object of the present invention to provide an independent wheel suspension for motor vehicles which avoids by simple means the aforementioned shortcomings and drawbacks encountered in the prior art.

Another object of the present invention resides in an independent wheel suspension for motor vehicles in which changes in camber and unfavorable track changes are far-reachingly minimized.

A further object of the present invention resides in an independent wheel suspension for motor vehicles, especially for the non-steerable wheels thereof, which not only keeps small the changes in camber and the changes in track but also provides the necessary acceleration and deceleration support required for the driving confort desired in modern motor vehicles.

Still another object of the present invention resides in an independent wheel suspension for motor vehicles which produces relatively small changes in camber as well as a desired change in toe-in.

Another object of the present invention resides in an independent wheel suspension of the type described above in which the negative influences conditioned by the position of the various guide members is compensated for in an effective manner.

Still another object of the present invention resides in an independent wheel suspension of the type described above which is very compact and space-saving and which permits a rational utilization of the various parts for the suspension and spring support.

These and further objects, features and advantages of the present invention will become more apparent from the following description when taken in connection with the accompanying drawing which shows, for purposes of illustration only, several embodiments in accordance with the present invention, and wherein:

FIG. 3 is a rear elevational view of the wheel suspension according to FIG. 1;

FIG. 4 is a plan view of a modified embodiment of an independent wheel suspension according to the present invention whereby in this embodiment the upper guide member extends rearwardly from its point of pivotal connection on the wheel side and the cross guide member is constructed as torsion rod guide member; and FIG. 5 is a plan view of a still further modified embodiment of an independent wheel suspension according to the present invention in which the upper guide member also extends rearwardly from its point of pivotal connection on the wheel side.

Figure 1:
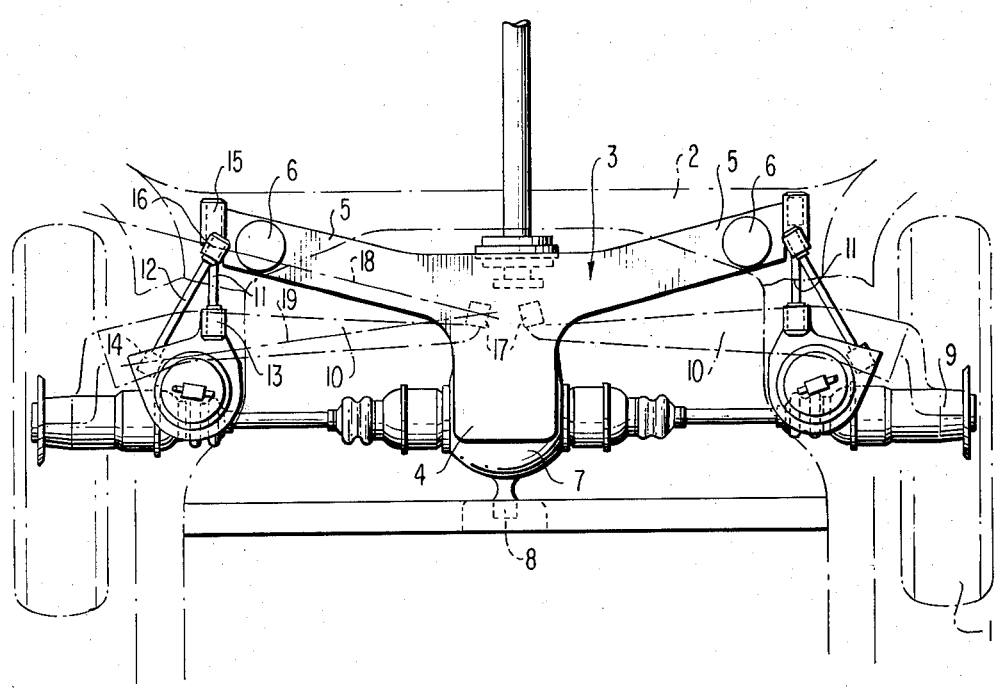
FIG. 1 is a plan view of an independent wheel suspension according to the present invention constructed as rear wheel suspension for motor vehicles.
Figure 2:
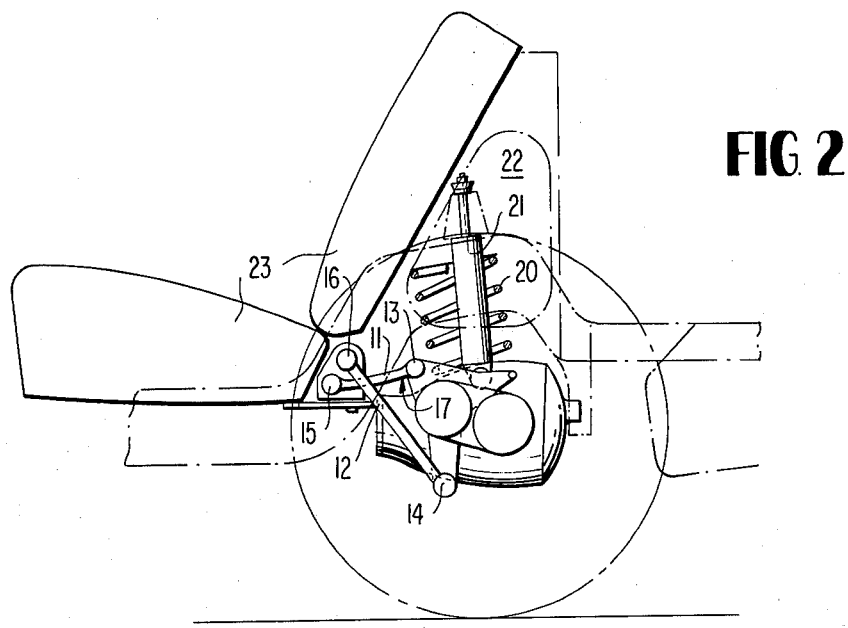
FIG. 2 is a side elevational view of the wheel suspension according to FIG. 1.

Referring now to the drawing wherein like reference numerals are used throughout the various views to designate like parts, and more particularly to FIGS. 1 to 3, reference numeral 1 designates in this embodiment the non-steerable wheels of a motor vehicle guided by way of an independent wheel suspension according to the present invention; of this motor vehicle, in addition to the wheel suspension itself and the axle drive, only the part of the floor structure 2 disposed within the area of the wheel suspension is illustrated herein since the rest forms no part of the present invention. The wheel suspension is connected with the floor structure 2 in the illustrated embodiment according to the present invention by way of an auxiliary frame structure in the form of a drive stool generally designated by reference numeral 3 which includes a center portion 4, with which are connected within the area of its forward end, arms 5 extending toward opposite sides of the vehicle. The forward rubber-elastic fastening means 6 of the auxiliary frame 3 in the form of a drive stool with respect to the floor structure 2 are disposed within the area of the ends of the arms 5. Within the area of its center rearward part 4, the drive stool 3 forming the auxiliary frame is connected with the differential gear 7 and together with the differential gear 7 is again fastened at the floor structure 2 within the area of the vehicle longitudinal center. The rear fastening point is designated by reference numeral 8 and is again constructed preferably rubber-elastic in any conventional manner.

The wheels 1 are guided each by way of independent wheel suspensions which include each one cross guide member 10 rigidly connected with the wheel carrier 9 as well as upper and lower guide arms 11 and 12. The guide arms 11 and 12 extend in the embodiment illustrated in FIGS. 1 to 3 both from the points of pivotal connection thereof on the side of the wheel which are designated by reference numerals 13 and 14, in the forward direction and are pivotally connected in the points of pivotal connection on the body- or frame-side which are designated by reference numerals 15 and 16, at the arms 5 of the drive stool 3. In addition to these points of pivotal connection, the point of pivotal connection on the body side of the cross guide member 10 is provided in the longitudinal center area of the vehicle at the drive stool 3, which point of pivotal connection is designated by reference numeral 17.

The axes, about which pivot movements take place in case of spring movements of the respective wheel, are determined by the points of pivotal connection of the guide members 10 to 12. For purposes of explaining the function of the wheel suspension according to the present invention, of these points of pivotal connection are of significance in particular the pivot axis 18 determined by the points of pivotal connection 16 and 17 and the pivot axis 19 determined by the points of pivotal connection 14 and 17.

For purposes of explaining the functioning, it is appropriate to start initially with the imagined fact that the wheel carrier 9, contrary to the actual conditions, is rigidly connected with the lower guide member 12 and thus together with the cross guide member 10 forms a triangular guide member which is pivotal about the axis 18. Since the axis 18 is not parallel to the wheel axis and in the illustrated embodiment extends with a slight inclination downwardly and obliquely inwardly and rearwardly, toe-in changes result during the spring movements which are the larger, the further the position of the axis 18 is inclined with respect to the vertical vehicle cross plane, as viewed in rear view. Such toe-in changes during spring movements of the wheel are far-reachingly undesirable and are compensated for by the solution of the present invention at least partially in that in the actual construction, contrary to the preceding assumption, the lower guide member 12 is not rigidly but pivotally connected with the wheel carrier 9 in the point of pivotal connection 14 and in that the wheel carrier 9 is guided additionally in a point of pivotal connection 13 by way of the upper guide member 11.

If one starts with the fact that, again assuming a rigid connection between the lower guide member 12 and the wheel carrier 9, the point 13 describes a circular arc about the axis 18 during spring movements with an upper guide member 11 disconnected from the wheel carrier 9, then, with a pivotal connection in the point 14, with a pivotal connection of the upper guide member 11 in the point 13 and with a pivotal connection on the body side of the upper guide member 11 in the point of pivotal connection designated by reference numeral 15 which is disposed at a distance to the pivot axis 18 and/or outside the plane containing the point of pivotal connection 13 and perpendicular to the pivot axis 18, an additional rotary movement about the axis 19 is forcibly brought about during spring movements by the guide member 11. This forcible additional rotary movement brings about a track change, and more particularly, by reason of the fact that the point 13 now no longer rotates along a circular path about the axis 18 but instead moves now nearly along a circular path about the point 15--exactly along the surface of a sphere with the center point 15--which as viewed in a side view, is formed by the position of the axis of the upper guide member 11 with respect to the tangent to the movement path of the point 13, with assumed fixed connection in the point 14 with respect to the movement path which would be described if the point 15 were located on the tangent, and, as a result thereof, brings about a rotation of the toe-in curve. Unfavorable developments of the toe-in curve can be corrected thereby.

In relation to a construction according to FIGS. 1 to 3, in which the point of pivotal connection 17 on the body side of the cross guide member 10 is located higher than the point of pivotal connection 14 on the wheel side of the lower guide member 12 and lower than the point of pivotal connection 16 thereof on the body side, it follows therefrom for achieving a toe-in curve which has an at least approximately symmetrical configuration, i.e., in which the toe-in proceeds at least nearly similarly during inward and outward spring movements, that the upper guide member 11 has to be so inclined with respect to the tangent that its longitudinal axis extends through the plane defined by the points of pivotal connection 14 and 16 of the lower guide member 12 and the point of pivotal connection 17 on the body side of the cross member 10, below the pivot axis 18 determined by the points of pivotal connection 16 and 17 on the body side of the lower guide member 12 and of the cross guide member 10. Other positions of the aforementioned points of pivotal connection with respect to each other require another position of the longitudinal axis of the upper guide member 11 to the tangent as reference straight line in side view.

Whereas the toe-in is influenced by the described arrangement of the upper guide member 11, the arrangement for the remaining points of pivotal connection is made in such a manner that as good as possible a starting and braking support or bracing is achieved.

Owing to the fact that the point of pivotal connection 17 on the frame side of the cross guide member 10 is located at a distance in front of the vertical vehicle cross plane containing the wheel centers, a relatively large pendulum length results with the construction of the present invention so that the camber changes remain small during spring movements.

As can be further seen from the embodiment according to FIGS. 1 to 3, with the construction according to the present invention, the support springs 20 formed by coil springs are supported on the wheel carriers 9 near the wheel axis, as viewed in side view, and the shock absorbers 21 are arranged on the inside of these springs 20. This arrangement of the springs and of the shock absorber has as a consequence a very good transmission behavior for the spring forces. Furthermore, this arrangement in conjunction with the illustrated arrangement of the guide members leads to a wheel suspension which is very small in construction, particularly as in the embodiment according to FIGS. 1 to 3, the upper guide member 11 extends forwardly from its point of pivotal connection 13 on the wheel side. The point of pivotal connection 13 on the wheel side is located in the illustrated embodiment within the center area between the vertical plane containing the wheel axes and the pivot axis 18 constituted by the points of pivotal connection 16, 17 on the frame side of the lower guide member 12 and of the cross guide member 10.

The vehicle tank designated by reference numeral 22 is indicated above the wheel suspension in the side view according to FIG. 2. Furthermore, in this figure also the rear seats of the vehicle which are designated by reference numeral 23 are indicated in their outlines.

A further embodiment is illustrated in FIG. 4, and more particularly in schematic plan view. Since the constructional principles in the wheel suspension illustrated in FIG. 4 are the same, corresponding reference numerals of the 100 series are used in connection with this figure, and in the illustration according to FIG. 4, which shows only one axle side, the wheel is designated by reference numeral 101, the wheel carrier by reference numeral 109, the cross guide member by reference numeral 110, the upper guide member by reference numeral 111, and the lower guide member by reference numeral 112. In contrast to the embodiment according to FIGS. 1 to 3, the upper guide member 111 extends toward the rear from its point of pivotal connection 113 at the wheel carrier side. The point of pivotal connection on the wheel carrier side of the lower guide member 112 is designated by reference numeral 114. Of the points of pivotal connection on the body side, the one of the upper guide member 111 is designated by reference numeral 115, while that of the lower guide member 112 carries the reference numeral 116 and that of the cross guide member 110, the reference numeral 117. Whereas now the points of pivotal connection 113 to 116 on the wheel and body side of the upper guide member 111 and of the lower guide member 112 may be constructed as in FIGS. 1 to 3, and may be constructed in part as ball joints (113 and 114) and in part by rubber-elastic bearing bushes (115 and 116), the connection in the point of pivotal connection generally designated by reference numeral 117 on the body side of the cross guide member 110 is constituted by a cardan joint which permits no rotatability about the longitudinal axis of the cross guide member 110. The cross guide member 110 includes in the embodiment according to FIG. 4 a torsion rod spring 124 as elastically torsional guide member which is connected with the wheel carrier 109 outside the wheel axis, in the illustrated embodiment at an arm 125 provided at the wheel carrier 109 and projecting forwardly. The torsion rod spring 124 is non-rotatably connected with the wheel carrier 109 by way of the arm 125. Furthermore, in the illustrated embodiment of FIG. 4, the torsion rod spring 124 is surrounded by a tubular casing 126 which establishes a bending-stiff connection between the wheel carrier 109 or the arm 125 thereof and the cardan joint provided in the point of pivotal connection 117. For that purpose, the tubular casing or column 126 is rigidly mounted at the arm 125 in the illustrated embodiment according to the present invention. On the opposite side, the torsion rod spring 124 is non-rotatably retained in a bush or sleeve 127 of the cardan joint, whose outside may form the support surface for the tubular casing 126 which is rotatable with respect to the cardan joint or the bush 127. The cardan joint has an axis of rotation which coincides with the straight line of connection between the point of pivotal connection 117 and the point of pivotal connection 115 on the body side of the upper guide member 111. This axis of rotation is designated by reference numeral 128. The second axis of rotation which is perpendicular thereto is at least approximately perpendicular to that plane which is defined by the pivot axis 128 and the pivot axis of the torsion rod. This second axis of rotation is designated by reference numeral 129. The axis of rotation 128 and the axis of rotation of the torsion rod 124 subtend an angle which opens in the direction toward the respective wheel.

In an embodiment as is described by reference to FIG. 4, a particularly simple structure is achieved, in which it is appropriate if, as not further shown herein, the shock absorber belonging to the corresponding axle side is so arranged that it extends approximately tangentially to the movement curve of its point of pivotal connection on the wheel carrier side resulting during spring movements.

The use of a torsion rod in conjunction with a bending-rigid tubular casing has proved as appropriate to be able to undertake a good matching of the spring system without regard to the required bending stiffness of the cross guide member. Of course, it is also possible within the scope of the solution according to the present invention, to provide exclusively a torsion rod spring as cross guide member or also to select a construction in which a corresponding tubular member provided with longitudinal slots is provided as cross guide member.

In the embodiment according to FIG. 5, a construction similar to to FIG. 4 is illustrated, utilizing corresponding reference numerals of the 200 series, in which the points of pivotal connection on the body side of the respective guide members 210 to 212 are provided at an auxiliary bearer which is designated in this embodiment by reference numeral 230. The auxiliary bearer 230 has in plan view a U-shaped base form and is connected in the points of pivotal connection 231 with the body or frame of the vehicle (not shown). With a construction symmetrical to the vehicle longitudinal axis of the wheel suspension, which is only shown for one vehicle side, the U-shaped auxiliary bearer 230 belonging to one axle side is connected by way of the differential gear 207 with the corresponding auxiliary bearer belonging to the opposite axle side. With respect to the other parts which are illustrated in the embodiment according to FIG. 5, corresponding reference numerals of the 200 series are used which correspond to those in FIGS. 1 to 4; more particularly, the wheel is designated by reference numeral 201, the cross guide member by reference numeral 210, the upper guide member by reference numeral 211 and the lower guide member by reference numeral 212. The points of pivotal connection of the guide members, of which the cross guide member 210 is again rigidly connected with the wheel carrier 209, are designated by reference numerals 213 to 217.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim:

1. An independent wheel suspension for supporting a wheel at a vehicle body comprising:
    a wheel carrier means for directly rotatably supporting a wheel, said wheel carrier means being movable with said wheel,
    a cross guide means fixedly connected to said wheel carrier means and pivotally mounted at a vehicle body by a first pivot mounting.
    an upper longitudinal guide means pivotally mounted at said wheel carrier means by a second pivot mounting and pivotally mounted at said vehicle body by a third pivot mounting,
    and a lower longitudinal guide means separate from said upper guide means and pivotally mounted at said wheel carrier by a fourth pivot mounting and pivotally mounted at said vehicle body by a fifth pivot mounting.

2. A wheel suspension according to claim 1, wherein said fourth pivot mounting is vertically below said second pivot mounting, wherein said vehicle body has a longitudinal extent which is parallel to the normal travel direction of said wheel, wherein said upper and lower guide means extend generally in the longitudinal direction of the vehicle body between their respective pivot mountings, and wherein said lower guide means extends upwardly in the forward direction from said fourth pivot mounting to said fifth pivot mounting.

3. A wheel suspension according to claim 2, wherein said lower guide means extends obliquely inwardly toward the longitudinal centerline of the vehicle body in the forward direction from the fourth to the fifth pivot mountings.

4. A wheel suspension according to claim 2, wherein first pivot mounting is positioned forwardly of the axis of rotation of said wheel such that said cross guide means extends obliquely forwardly from said wheel carrier means to said first pivot mounting.

5. A wheel suspension according to claim 3, characterized in that the cross guide means includes a guide element elastically torsional in relation to its longitudinal axis which is pivotally connected on the body side in a non-rotatable manner in relation to its longitudinal axis.

6. A wheel suspension according to claim 3, characterized in that said cross guide means is constituted by a guide element elastically torsional in relation to its longitudinal axis.

7. A wheel suspension according to claim 6, characterized in that the guide element is pivotally connected on the body side in a cardan-like manner.

8. A wheel suspension according to claim 3, characterized in that the points of pivotal connection at said first, third, and fifth pivot mountings are provided at an auxiliary bearer means.

9. A wheel suspension according to claim 1, wherein said cross guide means is separate from any drive means for rotatably driving said wheel.

10. A wheel suspension according to claim 3, wherein said cross means is separate from any drive means for rotatably driving said wheel.

11. A wheel suspension according to claim 4, wherein said cross guide means is separate from any drive means for rotatably driving said wheel.

12. A wheel suspension according to claim 4, characterized in that the wheel is a non-steered wheel of a motor vehicle.

13. A wheel suspension according to claim 4, characterized in that, in relation to a base position, the upper guide means is so arranged that, as viewed in side view, it extends at an angle to a perpendicular on a tangent which, assuming a rigid connection of the lower guide means with the wheel carrier means in a position corresponding to the base position and a disconnection of the upper guide means from the wheel carrier means, is placed against the movement path described by the point of pivotal connection at said second pivot mounting during a rotation about a pivot axis defined by the points of pivotal connection at said fifth and first pivot mountings.

14. A wheel suspension according to claim 13, wherein said cross guide means is separate from any drive means for rotatably driving said wheel.

15. A wheel suspension according to claim 13, characterized in that with the point of pivotal connection at said first pivot mounting located higher than the point of pivotal connection at said fourth pivot mounting and lower than the point of pivotal connection at said fifth pivot mounting, the upper guide means is so inclined with respect to said tangent that its longitudinal axis intersects the plane defined by the points of pivotal connection at said first, fourth and fifth pivot mountings, below the pivot axis defined by the points of pivotal connection at said fifth and first pivot mountings.

16. A wheel suspension according to claim 13, characterized in that as viewed in a side view, with the point of pivotal connection at said first pivot mounting located higher than the point of pivotal connection at said fourth pivot mounting, the upper guide means is so inclined with respect to said tangent that its longitudinal axis intersects the plane defined by the points of pivotal connection at said first, fourth and fifth pivot mountings, above the pivot axis defined by the points of pivotal connection at said fifth and first pivot mountings.

17. A wheel suspension according to claim 13, characterized in that as viewed in a side view, with points of pivotal connection at the fourth and fifth pivot mountings disposed higher than the point of pivotal connection at said first pivot mounting, the upper guide means is so inclined with respect to said tangent that its longitudinal axis intersects a plane defined by the points of pivotal connection at the first, fourth and fifth pivot mountings, above the pivot axis defined by the points of pivotal connection at the fifth and first pivot mountings.

18. A wheel suspension according to claim 13, characterized in that as viewed in a side view, with the point of pivotal connection at the fourth pivot mounting disposed higher with respect to the point of pivotal connection at the first pivot mounting and with the point of pivotal connection at said fifth pivot mounting disposed lower than the point of pivotal connection at the first pivot mounting, the upper guide means is so inclined with respect to said tangent that its longitudinal axis intersects the plane defined by the points of pivotal connection at the first, fourth and fifth pivot mountings, below the pivot axis defined by the points of pivotal connection at the fifth and first pivot mountings.

19. A wheel suspension according to claim 3, characterized in that the point of pivotal connection at said second pivot mounting is located within the area in front of a vertical vehicle cross plane containing the wheel axis.

20. A wheel suspension according to claim 3, characterized in that the point of pivotal connection at said third pivot mounting is located in relation to the vehicle longitudinal direction, to the rear of the point of pivotal connection at said second pivot mounting.

21. A wheel suspension according to claim 3, characterized in that the point of pivotal connection at said second pivot mounting is located in a center area between a vehicle cross plane containing the wheel axis and the pivot axis defined by the points of pivotal connection at said fifth and first pivot mountings.

22. A wheel suspension according to claim 1, characterized in that the cross guide means includes a guide element elastically torsional in relation to its longitudinal axis which is pivotally connected on the body side in a non-rotatable manner in relation to its longitudinal axis.

23. A wheel suspension according to claim 22, characterized in that said guide element is constituted by a torsion rod spring.

24. A wheel suspension according to claim 1, characterized in that said cross guide means is constituted by a guide element elastically torsional in relation to its longitudinal axis.

25. A wheel suspension according to claim 24, characterized in that said cross guide means is constituted by a tubular member which is provided with longitudinal slots extending in the direction of its longitudinal axis.

26. A wheel suspension according to claim 24, characterized in that the guide element is pivotally connected on the body side in a cardan-like manner.

27. A wheel suspension according to claim 1, characterized in that the points of pivotal connection at said first, third, and fifth pivot mountings are provided at an auxiliary bearer means.

28. A wheel suspension according to claim 27, characterized in that said auxiliary bearer means is a drive stool.

29. A wheel suspension according to claim 19, characterized in that the point of pivotal connection at said second pivot mounting is located in the center area between a vehicle cross plane containing the wheel axis and a pivot axis defined by the points of pivotal connection at said first and fifth pivot mountings.

30. A wheel suspension according to claim 23, characterized in that said cross guide means is constituted by a guide element elastically torsional in relation to its longitudinal axis.

* * * * *